US012767007B2

(12) United States Patent
Amorim Torres et al.

(10) Patent No.: US 12,767,007 B2
(45) Date of Patent: Oct. 20, 2026

(54) ALTERNATING CURRENT BATTERY HEATING IN ELECTRICAL SYSTEM HAVING MULTIPLE ELECTRIC MOTORS

(71) Applicant: GM GLOBAL TECHNOLOGY OPERATIONS LLC, Detroit, MI (US)

(72) Inventors: Renato Amorim Torres, Pontiac, MI (US); Neeraj S. Shidore, Novi, MI (US); Suresh Gopalakrishnan, Troy, MI (US); Wesley G. Zanardelli, Rochester, MI (US); Madhusudan Raghavan, West Bloomfield, MI (US); Satish P. Ketkar, Troy, MI (US); Vinod Chowdary Peddi, Shelby Township, MI (US); Chandra S. Namuduri, Troy, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 558 days.

(21) Appl. No.: 18/516,152

(22) Filed: Nov. 21, 2023

(65) Prior Publication Data

US 2025/0162460 A1 May 22, 2025

(51) Int. Cl.

| | |
|---|---|
| ***B60L 1/00*** | (2006.01) |
| ***B60L 50/51*** | (2019.01) |
| ***B60L 58/27*** | (2019.01) |

(52) U.S. Cl.
CPC ............... *B60L 58/27* (2019.02); *B60L 50/51* (2019.02); *B60L 2240/545* (2013.01)

(58) Field of Classification Search
CPC .... B60L 58/27; B60L 50/51; B60L 2240/545; B60L 1/003
See application file for complete search history.

(56) References Cited

U.S. PATENT DOCUMENTS

2023/0097060 A1* 3/2023 Ling ....................... B60L 1/003 318/139

* cited by examiner

*Primary Examiner* — Cortez M Cook
(74) *Attorney, Agent, or Firm* — Quinn IP Law

(57) ABSTRACT

A multi-motor electrical system for a motor vehicle or another host system includes a plurality of inverter circuits connected to the battery pack, a plurality of electric motors connected to the battery pack via a corresponding one of the inverter circuits, and an electronic controller. In response to predetermined entry conditions, the controller is configured to perform a method by which the controller monitors respective motor temperatures of the motors, selectively injects respective direct-axis (d-axis) currents into the motors via manipulation of a corresponding d-axis voltage command thereto, and generates an alternating current (AC) battery current via simultaneous operation of the electric motors using the d-axis currents. The controller heats the battery pack using the AC battery current by coordinating an injection of the d-axis currents, such that the respective motor temperatures do not exceed a predetermined motor temperature limit.

20 Claims, 7 Drawing Sheets

40
RMP $I_d$ M1
M1
RMP $I_d$ M2
M1, M2
MOD
$I_q$ - M1
42
43
$I_d$ - M1
$I_d(A)$
A1
0
-A1

$I_q$ - M2
t (min)
44
45
$I_d$ - M2 t (min)
46
$I_{BAT}$
$I_{BAT}(A)$

ALTERNATING CURRENT BATTERY HEATING IN ELECTRICAL SYSTEM HAVING MULTIPLE ELECTRIC MOTORS

INTRODUCTION

The present disclosure relates to heating of a battery pack in an electrical system having multiple alternating current (AC)-powered rotary electric machines, and to computer-based control methodologies for heating such a battery pack.

Advanced hybrid-electric and full-electric motor vehicles may include multiple rotary electric machines, with such machines configured as electric propulsion or traction motors and a traction battery pack. For instance, different drive axles or road wheels of a motor vehicle may be driven by a corresponding traction motor. In such a powertrain configuration, the various traction motors are energized by the controlled discharge of the traction battery pack. When the traction motors are configured as AC machines, one or more inverter circuits are disposed between the traction battery pack and the traction motors. High-speed switching operation of internal power switches of each of the inverter circuits inverts a direct current (DC) voltage from the traction battery pack to form an AC waveform suitable for energizing phase windings of the traction motors. The energized traction motors are thus able to power a driven load, including one or more road wheels in a representative automotive application.

Motor vehicles and other electrical systems having the above-noted traction battery pack are frequently idle when parked for extended periods. This may occur in cold ambient conditions, which in turn lowers the battery's temperature. For optimal charging efficiency and prolonged battery life, the traction battery pack is typically warmed to a threshold charging temperature prior to commencing offboard charging. However, the motor vehicle or other host electrical system may lack a resident fluidic thermal management system (TMS), or the available heating response of an onboard TMS may be suboptimal for a given charging scenario and/or prevailing weather conditions.

SUMMARY

Disclosed herein are electric circuit topologies and related computer-based control methodologies for selectively heating an electrochemical battery pack of an electrical system having two or more rotary electric machines, each of which is powered by a respective motor drive circuit. The electrical system is exemplified herein as a hybrid electric or battery electric motor vehicle solely for illustrative consistency. The motor vehicle includes two or more such electric machines each constructed and operating as an alternating current (AC) traction motor. The traction motors are configured to generate torque for powering one or more road wheels of the motor vehicle. However, other mobile or stationary electrical systems having multiple electric machines may similarly benefit from the present teachings, and therefore the present disclosure is not limited to vehicular applications.

A multi-motor electrical system in accordance with an aspect of the disclosure includes a battery pack, a plurality of inverter circuits, a plurality of electric motors, and an electronic controller. The electric motors are connected to the battery pack via a corresponding one of the inverter circuits. The electronic controller is in communication with the inverter circuits. In response to predetermined entry conditions, e.g., a temperature of the battery pack and/or an ambient temperature being less than a minimum charging temperature, the electronic control monitors respective motor temperatures of the electric motors, e.g., as reported or measured values, and selectively inject respective direct-axis (d-axis) currents into the electric motors. This occurs via manipulation of a corresponding d-axis voltage command thereto, as appreciated in the art. The electronic controller also generates an AC battery current via the electric motors using the d-axis currents.

As part of this embodiment, the electronic controller heats the battery pack using the AC battery current. This action occurs until a battery temperature of the battery pack reaches a predetermined battery temperature limit, and includes coordinating the d-axis currents such that the respective motor temperatures do not exceed a predetermined motor temperature limit of the electric motors.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 1:
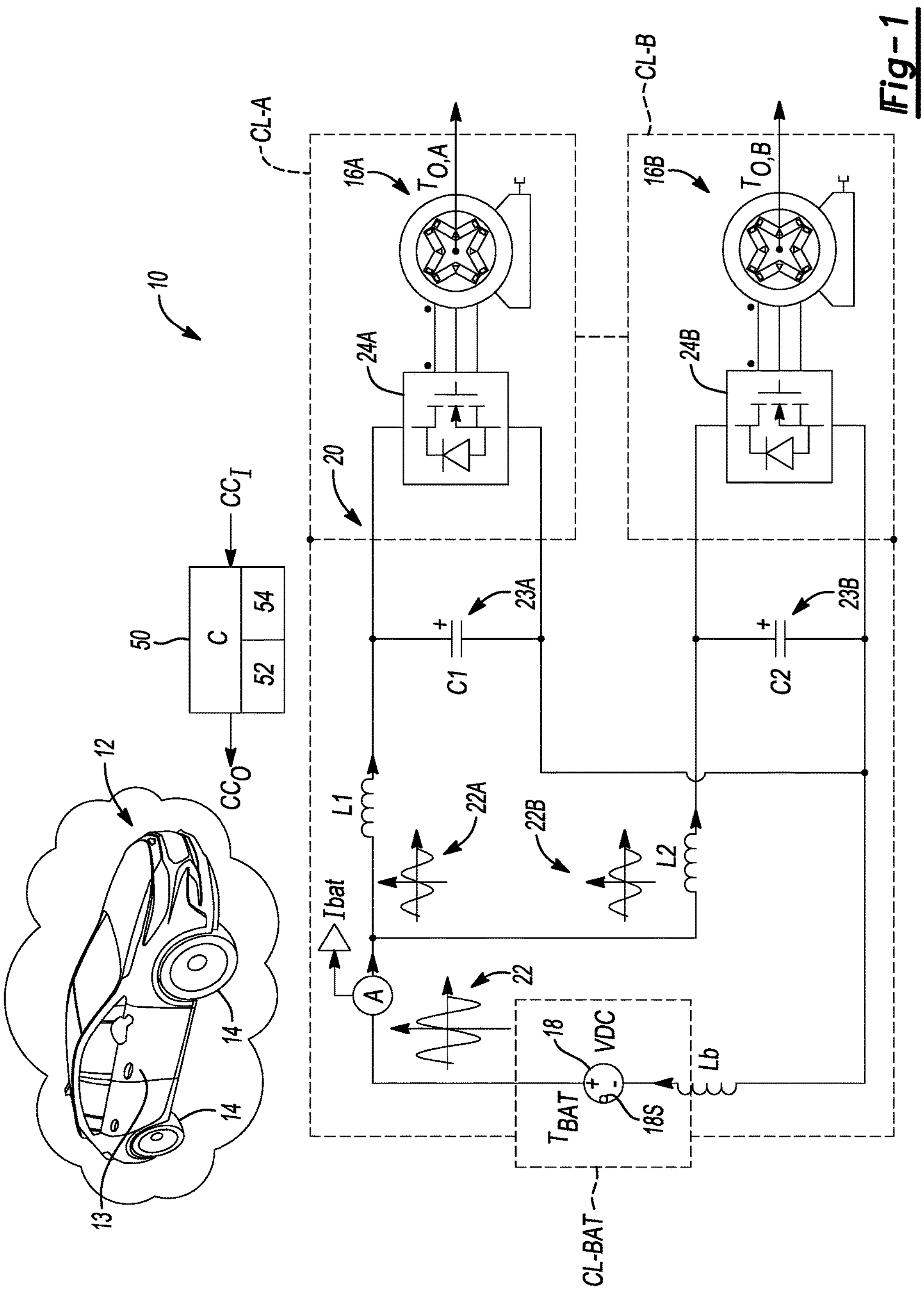
FIG. 1 illustrates an electrical system of a representative motor vehicle having a traction battery pack and multiple electric traction motors, with the traction battery pack being selectively heated via a control methodology as set forth in detail herein.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring to the drawings, wherein like reference numerals correspond to like or similar components throughout the several Figures, a multi-motor electrical system 10 is illustrated in FIG. 1. In a non-limiting representative embodiment, the multi-motor electrical system 10 may be used as part of a motor vehicle 12 having a vehicle body 13 and road wheels 14 connected thereto. The motor vehicle 12 may be embodied as a hybrid electric vehicle or a battery electric vehicle in different configurations. Other mobile systems such as trains, boats, and aircraft could be similarly equipped with the multi-motor electrical system 10 described herein, and therefore the motor vehicle 12 is just one possible host system within the scope of the disclosure.

One or more of the road wheels 14 may be powered by respective first and second traction motors 16A and 16B of the multi-motor electrical system 10 in such a construction, i.e., with generated motor output torques $T_{O,A}$ and $T_{O,B}$ ultimately being delivered to one or more drive axles and/or road wheels 14 of the motor vehicle 12. A traction battery pack 18 of the multi-motor electrical system 10 may be constructed from an application-suitable group of electrochemical battery cells (not shown), e.g., lithium-ion or lithium-polymer battery cells of a pouch, can, or prismatic type, to output a direct current (DC) voltage (VDC). The traction battery pack 18 as contemplated herein is selectively heated by an alternating current (AC) battery current 22. The AC battery current 22 for its part is generated by direct-axis (d-axis) voltage control of the first and second traction motors 16A and 16B as set forth below, and the resulting injection of a d-axis current as appreciated in the art. Additionally, AC heating of the traction battery pack 18 (and optionally the first and second traction motors 16A and 16B in some embodiments) may be assisted by a coordinated fluidic heat exchange between interconnected cooling loops CL-A, CL-B, and CL-BAT as described below. Thus, heating of the traction battery pack 18 may continue even after AC heating is completed.

In the simplified circuit topology of FIG. 1, the traction battery pack 18 is connected to a DC voltage bus 20 via a main battery contactor set (not shown). In propulsion modes of the motor vehicle 12, the traction battery pack 18 is discharged to energize corresponding inverter circuit 24A and 24B, each of which is coupled to a corresponding DC link capacitor 23A and 23B (C1 and C2, respectively). Inductors L1 and L2 likewise correspond to equivalent inductances on the DC voltage bus 20 for the corresponding first and second traction motors 16A and 16B.

As appreciated in the art, the inverter circuits 24A and 24B contain therein various solid-state power switches, e.g., insulated-gate bipolar transistors (IGBTs), metal-oxide-semiconductor field-effect transistors (MOSFETs), or other switchable semiconductor-based components. High-speed switching control of the inverter circuits 24A and 24B, typically via pulse-width modulation (PWM), thus converts a DC voltage from the traction battery pack 18 to an AC voltage suitable for energizing individual phase windings of the first and second traction motors 16A and 16B. Using PWM, operation of the inverter circuits 24A and 24B ultimately controls an output state of the first and second traction motors 16A and 16B when generating the output torque $T_{O,A}$ and/or $T_{O,B}$ during electric or hybrid electric propulsion modes of the motor vehicle 12.

HIGH-FREQUENCY AC HEATING: Selective AC-based internal heating of the traction battery pack 18 ("self-heating") as contemplated herein requires the selective application to the traction battery pack 18 of the high-frequency AC battery current 22. The term "high frequency" as used herein may be about 200 hertz (Hz) to 1 kHz or more in a possible implementation. In the illustrated FIG. 1 example, AC heating of the traction battery pack 18 is provided by respective AC current waveforms 22A and 22B resulting from d-axis current injection, by a resident electronic controller (C) 50, of the respective first and second traction motors 16A and 16B. When the AC current waveforms 22A and 22B are synchronized and perfectly in phase as shown, the respective amplitudes of the AC current waveforms 22A and 22B are additive. That is, the amplitude of the resulting AC battery current 22 is twice the amplitude of the AC current waveforms 22A and 22B. The present d-axis motor control strategy may therefore include the coordinated and sometimes simultaneous use of the respective first and second traction motors 16A and 16B to generate the resulting AC battery current waveform 22, with the AC current waveforms 22A and 22B being synchronized. In other embodiments as set forth below, the AC current waveforms 22A and 22B are at least partially out of phase, and therefore the scenario of FIG. 1 is just one possible approach.

Performance of the d-axis injections for the purpose of heating the traction battery pack 18 without overheating the first and second traction motors 16A and 16B involves the selective use of an oscillating d-axis voltage command to the first and second traction motors 16A and 16B. This occurs in conjunction with a quadrature-axis (q-axis) voltage command of zero. As a result of d-axis and q-axis voltage command manipulation on the d-axis and q-axis, a d-axis current is injected into the control architecture of the first and second traction motors 16A and 16B to cause the AC current waveforms 22A and 22B. As noted above, the AC current waveforms 22A and 22B ultimately combine to form the resulting AC battery current 22, which is then applied across electrode terminals of the traction battery pack 18. This oscillating current thus heats the traction battery pack 18, albeit at the expense of heating the first and second traction motors 16A and 16B. Coordination of d-axis current injections of the first and second traction motors 16A and 16B is thus performed by the electronic controller 50 as described below.

Charging of the traction battery pack 18 of FIG. 1 in one or more embodiments is not permitted by the electronic controller 50 when a battery temperature ($T_{BAT}$) of the traction battery pack 18, e.g., as measured by a temperature sensor 18S or estimated, calculated, or otherwise determined from ambient temperature, remains below a specified lower temperature limit suitable for charging, e.g., about 32-35° F. In this case, the electronic controller 50 may execute computer-readable instructions to initiate an AC-based self-heating mode as described herein.

Within the scope of the present disclosure, the electronic controller 50 includes one or more processors 52 and memory 54. Each processor 52 is configured to receive or self-generate input signals ($CC_I$). The input signals ($CC_I$) may include the measured battery temperature ($T_{BAT}$) as communicated by the temperature sensor 18S, a mode signal indicative of a present operating mode of the multi-motor electrical system 10, e.g., the speed, transmission state, and on/off state of the motor vehicle 12, and possibly other input values. In response to receipt of the input signals ($CC_I$), the electronic controller 50 is configured to execute the present strategy as one or more algorithms or instruction sets, with the electronic controller 50 ultimately transmitting output signals ($CC_O$) to the inverter circuits 24A and 24B of FIG. 1. The output signals ($CC_O$) may include ON/OFF state commands or PWM signals for control of the conducting state of individual power switches (not shown) of the inverter circuits 24A and 24B. Computer-readable code or instructions for implementing the present multi-motor AC heating strategy may be stored in tangible, non-transitory portions of the memory 54, with the memory 54 embodying a computer-readable storage medium, e.g., magnetic or optical media, CD-ROM, and/or solid-state/semiconductor memory (e.g., various types of RAM or ROM).

The term "controller" and related terms such as control module, module, control, control unit, processor, and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). Non-transitory components of the memory 54 are those which are capable of storing machine-readable instructions in the form of one or more software or firmware programs or routines, combinational logic circuit(s), input/output circuit(s) and devices, signal conditioning and buffer circuitry and other components that can be accessed by the processor(s) 52 to provide the described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example about 50-100 millisecond (ms) intervals during ongoing operation. Alternatively, routines may be executed in response to occurrence of a triggering event.

D-AXIS VOLTAGE COMMANDS: as appreciated in the art, d-axis and q-axis commands in a motor control context are used as adjustable setpoints or control "knobs" or "handles" that may be accessed by the electronic controller 50 when controlling flux and torque settings of the first and second traction motors 16A and 16B. In geometric terms, the d-axis and q-axis are single-phase representations of the flux contribution of separate sinusoidal phase quantities occurring at the same angular velocity. The d-axis for a given one of the first and second traction motors 16A and 16B is aligned/in-phase with the permanent magnet field of a rotor thereof (not shown), and is the particular axis by which flux is primarily produced. The d-axis current is manipulatable by the electronic controller 50 using d-axis voltage commands, as described below when performing the AC-based self-heating mode of the traction battery pack 18.

Torque of the first and second traction motors 16A and 16B is produced primarily on their respective q-axes, which are typically aligned with the rotating field of respective a stator thereof (not shown), i.e., 90° out-of-phase with the magnetic field of the rotor. During the present self-heating mode, the q-axis voltage command is therefore set to zero to minimize torque generation and resulting movement of the motor vehicle 12. The q-axis command is used in motor control strategies to influence torque production. During the AC-based self-heating mode considered, however, the q-axis voltage command is purposefully set to zero and maintained there for the duration of the self-heating mode.

ZERO-SEQUENCE VOLTAGE COMMAND: a zero-sequence voltage command could be applied in one or more constructions of the first and second traction motors 16A and 16B to generate a balanced set of phase voltages. In a balanced three-phase system, for example, the individual phase voltages may be represented using complex numbers, with the zero-sequence voltage representing a voltage signal that is applied simultaneously to all three electrical phases, nominally the a, b, and c phases. Application of a balanced voltage signal causes a current to flow through stator windings of such a machine, which in turn produces a rotating magnetic field having a zero net magnetic field in every direction. Zero-sequence voltage commands, which do not contribute to mechanical torque production, may be selectively used herein to modify the magnetic field produced in the first and second traction motors 16A and 16B during the contemplated self-heating mode. That is, although a neutral connection point does not typically exist in an AC motor constructed for use in the multi-motor electrical system 10, unlike residential electrical systems, such a motor construction could be used in some embodiment. In such a case, the zero-sequence voltage command adds another control handle that could be leveraged for optimal performance of the self-heating mode.

Figure 2:
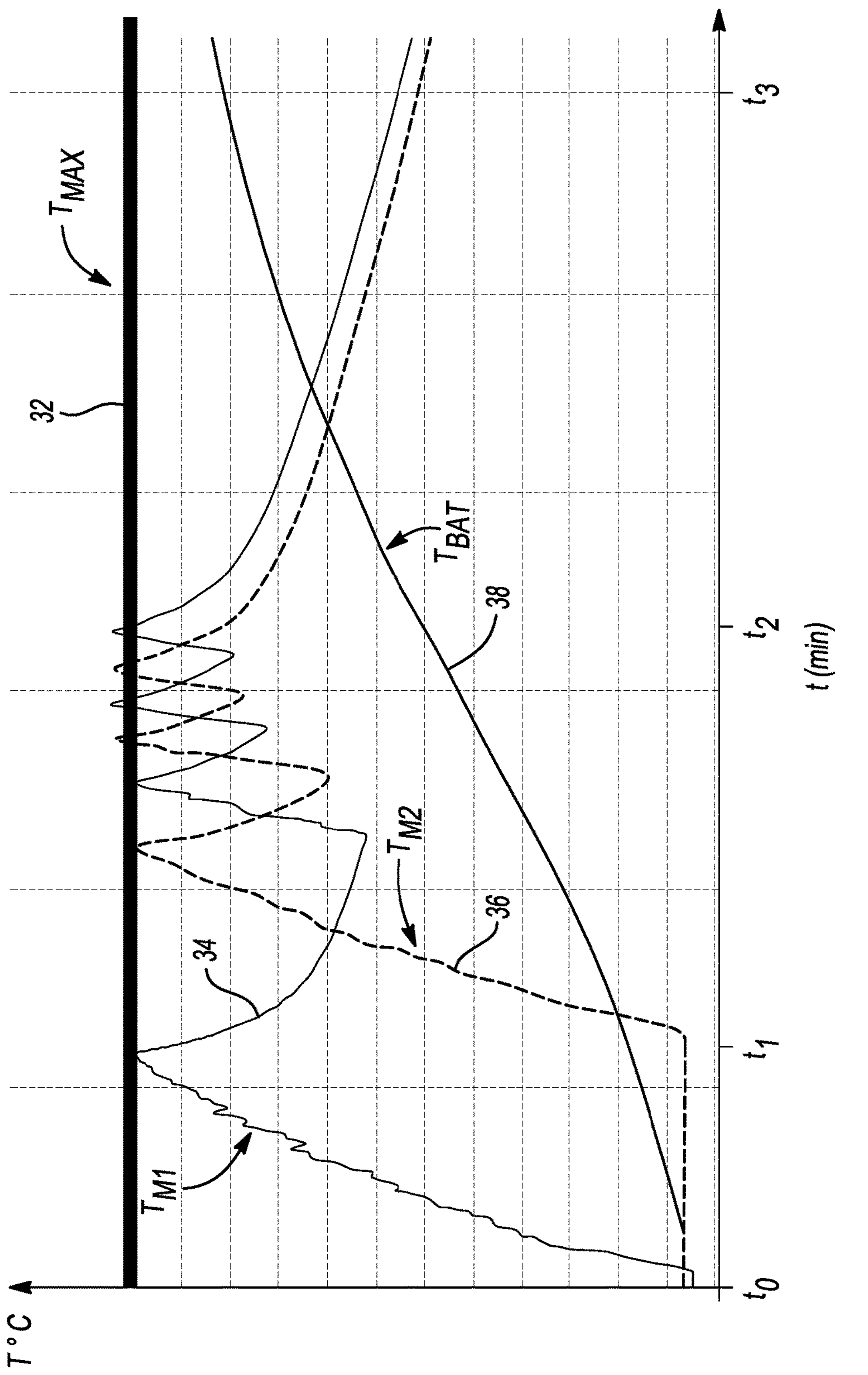
FIG. 2 is a time plot of motor and battery temperatures, with temperature and time depicted on the vertical and horizontal axis, respectively.

Referring now to a time plot 30 of FIG. 2, with time (t) in minutes (min) represented on the horizontal axis and temperature in degrees Celsius (T° C.) represented on the vertical axis, the electronic controller 50 of FIG. 1 could closely coordinate the AC heating contribution from the respective first and second traction motors 16A and 16B based on motor temperature. To that end, the electronic controller 50 may be configured to monitor respective motor temperatures ($T_{M1}$ and $T_{M2}$) of the first and second traction motors 16A and 16B, with motor temperatures ($T_{M1}$ and $T_{M2}$) also labeled as traces 34 and 36 for clarity. Such values could be directly measured by corresponding thermocouples, thermistors, or other suitably configured temperature sensors and/or reported to the electronic controller 50, e.g., via CAN signals. As noted above, the electronic controller 50 selectively injects respective d-axis currents for the first and second traction motors 16A and 16B via manipulation of a corresponding d-axis voltage command thereto. This action generates the AC battery current 22 (see FIG. 1).

As part of the present approach, the electronic controller 50 of FIG. 1 may heat the traction battery pack 18 using the AC battery current 22. As a result of the AC battery current 22, the battery temperature ($T_{BAT}$) begins to rise, as indicated by the representative upward trajectory of trace 38. This control action includes coordinating the d-axis current injections of the first and second traction motors 16A and 16B such that the respective motor temperatures ($T_{M1}$ and $T_{M2}$) do not exceed a predetermined motor temperature limit ($T_{MAX}$), i.e., trace 32.

The motor temperature limit ($T_{MAX}$) may be established as a static thermal limit, and thus recorded as a reference value in memory 54 of the electronic controller 50 shown in FIG. 1. Commencing at to, the electronic controller 50 may commence heating the traction battery pack 18 of FIG. 1 using d-axis voltage control of the first traction motor 16A as described above. The d-axis voltage control action results in d-axis current injection and generation of the AC current waveform 22A of FIG. 1. However, this action also results in heating of the first traction motor 16A, as indicated by the upward trajectory of trace 34. Thus, the electronic controller 50 may discontinue heating of the traction battery pack 18 at $t_1$ when the first traction motor 16A reaches the motor temperature limit ($T_{MAX}$), i.e., trace 32.

When this occurs, the electronic controller 50 may commence AC heating of the traction battery pack 18 using d-axis voltage control of the second traction motor 16B. As the first traction motor 16A cools, the second traction motor 16B begins to heat up as it outputs the AC current waveform 22B of FIG. 1. This upward trend is indicated by trace 36. The electronic controller 50 may then alternate d-axis control of the first and second traction motors 16A and 16B between $t_1$ and $t_2$ as shown to allow each machine to sufficiently cool once reaching the motor temperature limit ($T_{MAX}$). The electronic controller 50 is thus configured to coordinate the injection of the d-axis currents by alternating operation of the first and second traction motors 16A and 16B responsive to a motor temperature one of the first or second traction motors 16A or 16B reaching the predetermined motor temperature limit ($T_{MAX}$).

By $t_2$ in FIG. 2, both of the first and second traction motors 16A and 16B are operating near the motor temperature limit ($T_{MAX}$) of trace 32. At this point in time, the electronic controller 50 may terminate AC-based heating of the traction battery pack 18 of FIG. 1 altogether, which would allow the first and second traction motors 16A and 16B to gradually cool after $t_2$. In this manner, the electronic controller 50 is configured for coordinating injection of the d-axis currents such that the respective motor temperatures ($T_{M1}$ and $T_{M2}$) do not exceed the predetermined motor temperature limit ($T_{MAX}$). However, heating of the traction battery pack 18 does not necessarily cease, as noted by the continued rise in battery temperature ($T_{BAT}$), i.e., trace 38.

As noted briefly above, the electronic controller 50 in one or more embodiments may be configured to heat the traction battery pack 18 by transferring heat through a plurality of interconnected cooling loops each configured to circulate coolant to a respective one of the first and second traction motors 16A and 16B and the traction battery pack 18. The electronic controller 50 may be configured to direct waste heat from the first and second traction motors 16A and 16B to the traction battery pack 18 via the interconnected cooling loops, in this case from the cooling loop CL-A and/or CL-B of FIG. 1 into the cooling loop CL-BAT. As appreciated in the art, pump-based coolant circulation and coordinated actuation of valves and flow control devices within a thermal management system enable electrical coolant (not shown) to be directed into or around the various electronic components of the multi-motor electrical system 10. As a result, waste heat is removed from the first and second traction motors 16A and 16B of FIG. 1 and exhausted to the surrounding atmosphere.

Instead of doing this, some of the waste heat from the first and/or second traction motors 16A and/or 16B may be transferred into the cooling loop CL-BAT, thereby heating the traction battery pack 18 with heated coolant even after the electronic controller 50 discontinues AC-based heating. Thus, termination of AC-based heating of the traction battery pack 18 of FIG. 1 does not necessarily result in a cessation of heating of the traction battery pack 18, as other means of heating may continue unabated.

Figures 3A, 3B, 3C:
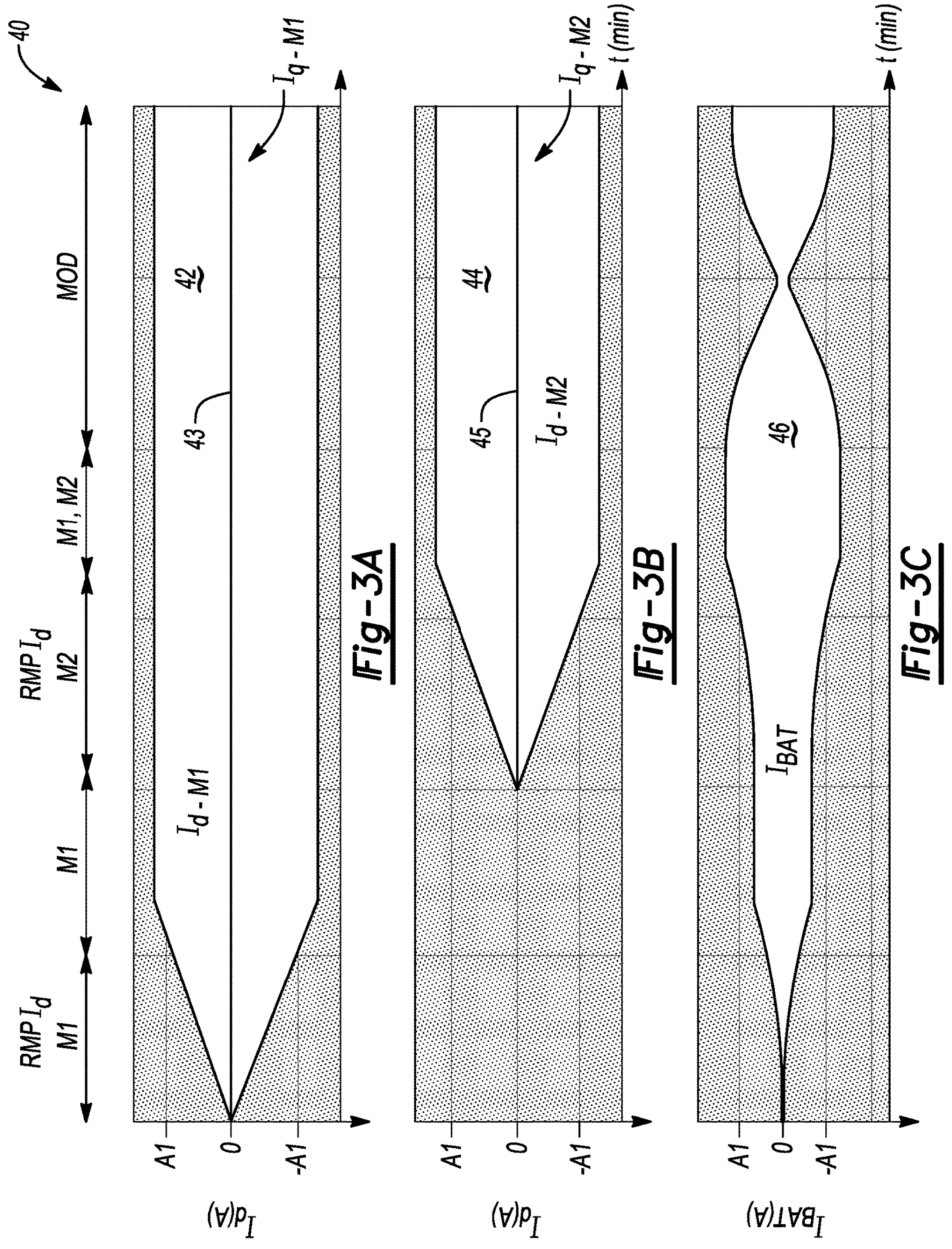
FIGS. 3A, 3B, and 3C illustrate direct-axis (d-axis) current injections and resulting alternating current (AC) battery current for heating the traction battery pack of FIG. 1 in accordance with the disclosure.

Referring to FIGS. 3A, 3B, and 3C, a working example of simultaneous AC-based heating of the traction battery pack 18 using the respective first and second traction motors 16A and 16B of FIG. 1 is illustrated via a set of current traces 40 on a representative time scale, with time (t) in minutes (min) represented on the horizontal axes and current amplitude in amps (A) represented on the vertical axes. In FIG. 3A, traces 42 and 43 represent the d-axis current and q-axis current of the first traction motor 16A of FIG. 1, i.e., $I_d$-M1 and $I_q$-M1. Traces 44 and 45 of FIG. 3B similarly represent the d-axis current and q-axis current of the second traction motor 16B, i.e., $I_d$-M2 and $I_q$-M2. For both of the first and second traction motors 16A and 16B, note that the q-axis currents remain at zero during AC heating of the traction battery pack 18. The AC battery current ($I_{BAT}$) is represented in FIG. 3C by trace 46, with trace 46 acting as the AC battery current 22 of FIG. 1 and ultimately caused by the injection of the two d-axis currents $i_d$-M1 and $i_d$-M2 of FIGS. 3A and 3B.

Viewing FIGS. 3A, 3B, and 3C together and beginning at to, the electronic controller 50 of FIG. 1 begins selective d-axis voltage injection for AC heating of the traction battery pack 18 by linearly increasing or "ramping" the d-axis current ($I_d$-M1) (trace 42 of FIG. 3A) for the first traction motor 16A. At $t_1$, the electronic controller 50 may hold the d-axis current ($I_d$-M1) steady until about $t_2$, at which point the electronic controller 50 may begin to ramp the d-axis current ($I_d$-M2) (trace 44 of FIG. 3B) for the second traction motor 16B. This continues until $t_3$. Thus, the AC battery current ($I_{BAT}$) (trace 46) ramps up from $t_0$ to $t_1$, then again from $t_2$ to $t_3$, as the first and second traction motors 16A and 16B operate simultaneously.

The AC battery current ($I_{BAT}$) (trace 46 of FIG. 3C) is held at steady state until $t_4$ with simultaneous operation of the respective first and second traction motors 16A and 16B, thus warming the traction battery pack 18 of FIG. 1 with coordinated multi-motor-based AC heating. At $t_4$, the electronic controller 50 of FIG. 1 may modify an injection phase angle ($\phi$) of the d-axis currents (traces 42 and 44 of FIGS. 3A and 3B) to thereby increase or decrease the rate of AC heating of the traction battery pack 18. That is, moving the d-axis currents (traces 42 and 44) out of phase relative to each other effectively reduces the amplitude of the AC battery current ($I_{BAT}$) (trace 46) due to cancellation.

Figure 4A:
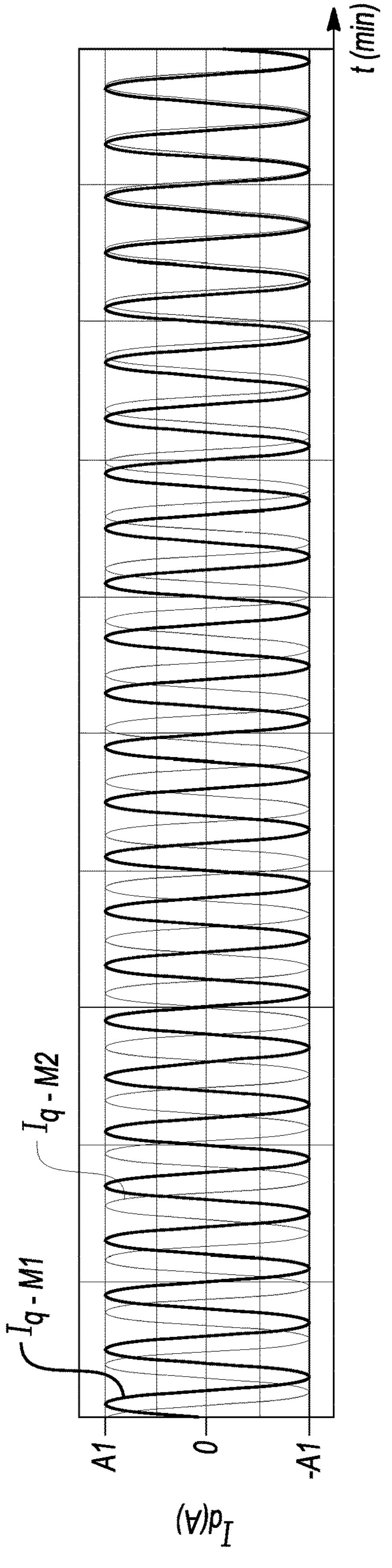
FIGS. 4A and 4B are time plots of d-axis current injections and a resulting AC battery current illustrating phase cancellation usable in one or more embodiments.
Figure 4B:
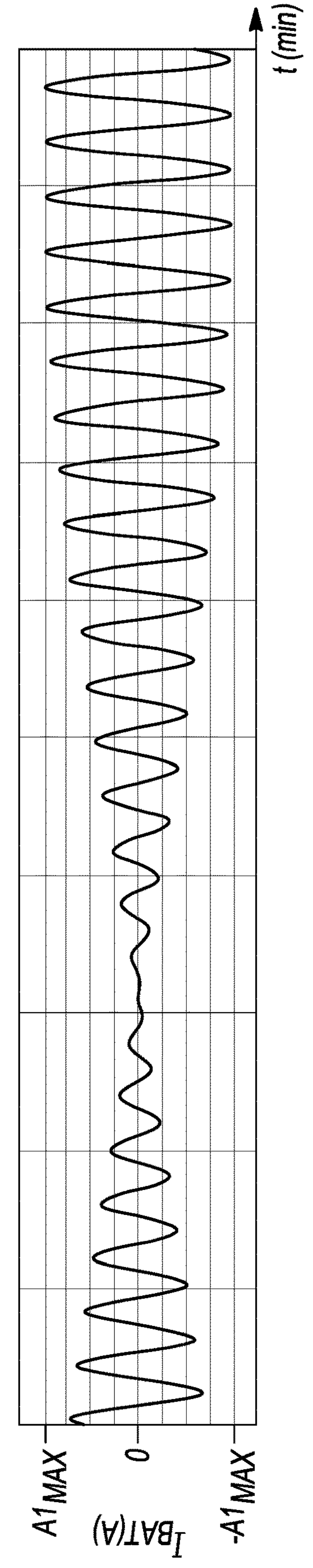

Referring briefly to FIGS. 4A and 4B, for instance, the injected d-axis currents ($I_d$-M1 and $I_d$-M2) of the same frequency and an amplitude ranging from A1 to −A1 will, when in phase, add together to increase the amplitude of the resulting AC battery current ($I_{BAT}$). It therefore follows that moving the same-frequency d-axis currents ($I_d$-M1 and $I_d$-M2) out of phase, to a selectable degree ranging from fully in-phase to 180° out of phase, will result in cancellation as shown in region 55 of FIG. 4B. Thus, purposeful phase angle manipulation by the electronic controller 50 of FIG. 1 using a "phase angle sweep-lock strategy" to adjust a phase angle difference between injected d-axis currents by the first and second traction motors 16A and 16B enables the electronic controller 50 to maximize AC heating of the traction battery pack 18. Such a technique may be used to "fine tune" the amount of AC heating of the traction battery pack 18 shown in FIG. 1. As the signals of FIG. 4A move out of phase relative to one another, the effects of AC-based heating of the traction battery pack 18 are reduced. An optimal phase angle exists therefore that the electronic controller 50 may use as part of the method 100.

To find this optimal phase angle, the electronic controller 50 of FIG. 1 may increase the phase angle of the signal injected on the d-axis of the second traction motor 16B until the AC battery current 22 (FIG. 1) to the traction battery pack 18 reaches its maximum possible value. This maximum possible value may be measured and defined beforehand, and thereafter used by the electronic controller 50 in the course of performing AC heating of the traction battery pack 18. The electronic controller 50 may then lock the phase angle when the maximum possible value has been reached. The process may be repeated as needed while performing AC heating so as to avoid relative angle drifting.

Synchronization of AC Heating: AC-based heating of the traction battery pack 18 of FIG. 1 may be synchronized in one or more embodiments. That is, the frequencies of the AC current waveforms 22A and 22B of FIG. 1 may be the same. The electronic controller 50 may inject the same injection frequency and regulate a phase difference between the AC current waveforms 22A and 22B of the respective first and second traction motors 16A and 16B while synchronizing the injection of the d-axis currents. Optional synchronization in this manner may provide optimal heating of the traction battery pack 18. Consider that the root mean square (RMS) current is determined as $$\frac{n}{\sqrt{2}}A,$$

where n is the number of waveforms, i.e., the two AC current waveforms 22A and 22B in the two-motor embodiment of FIG. 1, and A is the amplitude of the resulting AC battery current 22. In contrast, the RMS current in the asynchronized embodiments described below are determined as $$\frac{\sqrt{n}}{\sqrt{2}}A,$$

and thus less AC heating than the synchronized case.

A synchronization problem potentially arises due to the accuracy of oscillating crystals used by the electronic controller 50. A typical crystal is accurate to about ±100 parts per million, or about ±0.01%. Thus, for a representative 8 MHz oscillating crystal, the frequency will range from 7.9992-8.0008 MHz. In an exemplary case in which the injection frequency is 450 Hz, the frequency of the AC current waveforms 22A and 22B of FIG. 1 would be 450 Hz±0.01%, or 449.955-450.045 Hz. The difference of 0.09 Hz would potentially equate to a full cycle every 11.11 seconds in this illustrative example. Therefore, steps may be taken by the electronic controller 50 of FIG. 1 to periodically synchronize the electronic controller 50, which though shown as one device in FIG. 1 for illustrative clarity may be implemented as respective motor controllers for the first and second traction motors 16A and 16B.

The electronic controller 50 may be configured to synchronize an injection frequency of the d-axis currents $i_d$-M1 and $i_d$-M2 using a predetermined synchronization strategy. Two exemplary synchronization strategies include: (1) a communication channel synchronization strategy, or (2) a phase-locked loop (PLL) synchronization strategy. Communication channel synchronization, i.e., option (1), may entail using controller area network (CAN) bus signals or other differential signals between different control processors to determine a difference between the frequencies, and to thereafter correct for the difference. This may occur every 5-10 s in the above-noted 11.11 s example, or at another desired frequency in other implementations. While relatively simple to implement, this option would be predicated on reliable high-speed network communication, and thus is not necessarily suitable or available in a given application. Option (2), i.e., PLL-based synchronization, will now be described with reference to FIGS. 5A and 5B.

Figure 5A:
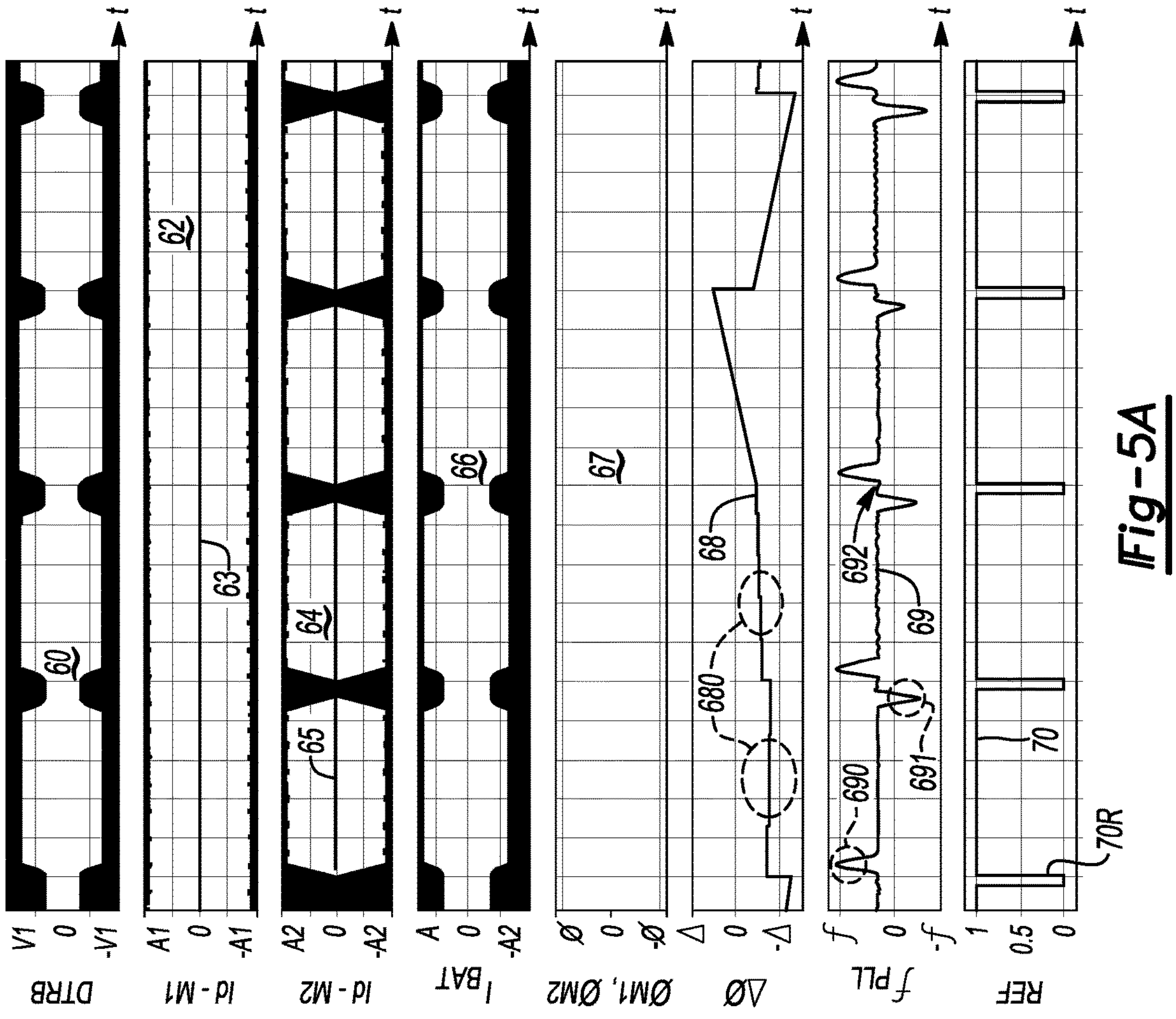
FIGS. 5A and 5B are representative plots of various waveforms collectively illustrating the present teachings when performing AC heating of a traction battery pack using two electric traction motors.
Figure 5B:
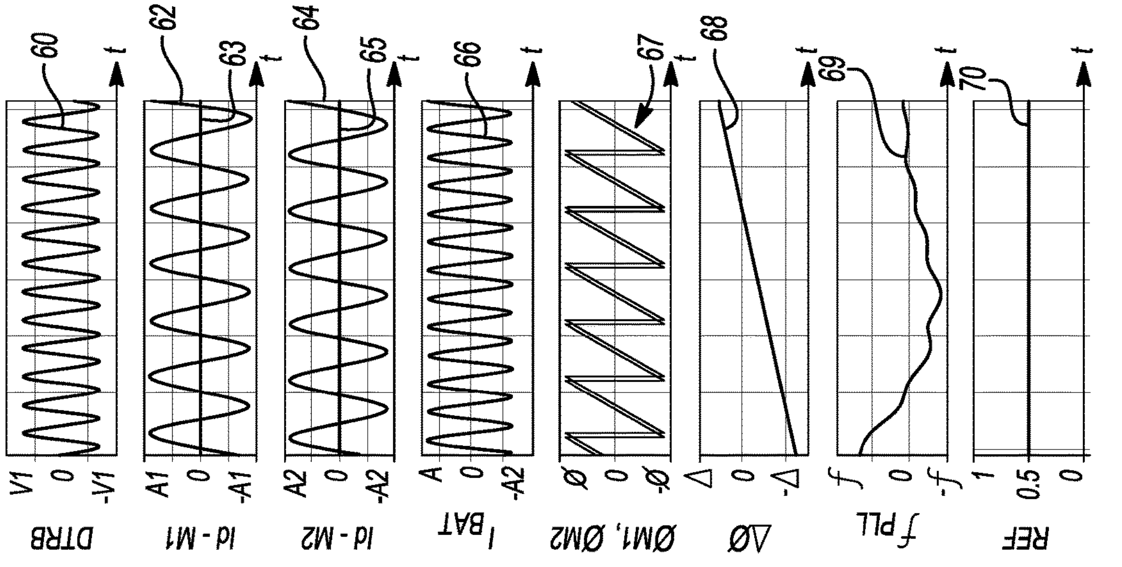

PLL-Based Synchronization: a variety of electrical values are depicted in FIGS. 5A and 5B, with FIG. 5B illustrating the waveforms of FIG. 5A over a shortened time period for illustrative clarity. The injected d-axis currents ($i_d$-M1 and $i_d$-M2) in the first and second traction motors 16A and 16B of FIG. 1 (traces 62 and 64) are shown with the zero q-axis currents ($i_q$-M1 and $i_q$-M2), i.e., traces 63 and 65, and with the resulting AC battery current ($I_{BAT}$) (trace 66). As disclosed above, this occurs via manipulation of d-axis voltage commands as set forth above. The process of current injection via the first traction motor 16A creates a small perturbation or disturbance (trace 60) on a DC-link voltage of the DC voltage bus 20. This disturbance may be measured and fed into corresponding PLL logic of the electronic controller 50 as an input signal, i.e., one of the input signals ($CC_I$) of FIG. 1, and thereafter used by the electronic controller 50 to synchronize injection of the d-axis current ($i_d$-M2) (trace 64) in the second traction motor 16B. However, the PLL logic may lose track of precisely when the second traction motor 16B is activated due to the PLL logic of the electronic controller 50 tracking the same angle that it is commanding.

To solve this potential control issue, d-axis current injection of the second traction motor 16B may be interrupted for short intervals to allow the PLL logic to properly track the injection angle $\phi_{M1}$ and injection frequency of the first traction motor 16A in case of small frequency or phase drift over time. The injection angle $\phi_{M1}$ and frequency obtained during this short interval may be used for updating synchronism of AC injection in the second traction motor 16B at a fixed rate, e.g., every 5-10 s in a possible implementation, with the actual rate being dependent on how quickly the AC current waveforms 22A and 22B of FIG. 1 become out of phase with respect to one another.

Also illustrated in FIGS. 5A and 5B are the injection angles ($\phi_{M1}$ and $\phi_{M2}$) (traces 68) for the first and second traction motors 16A and 16B, the injection angle difference ($\Delta\phi$) (trace 68) between these two injections, the PLL frequency ($f_{PLL}$) (trace 69), and a reference signal (trace 70) for triggering synchronization. Note that the reference signal (trace 70) may be selected based on the PLL frequency (trace 69) to trigger synchronization at the appropriate time, e.g., with synchronization occurring at the rising edge of the reference signal (trace 70).

Figure 6:
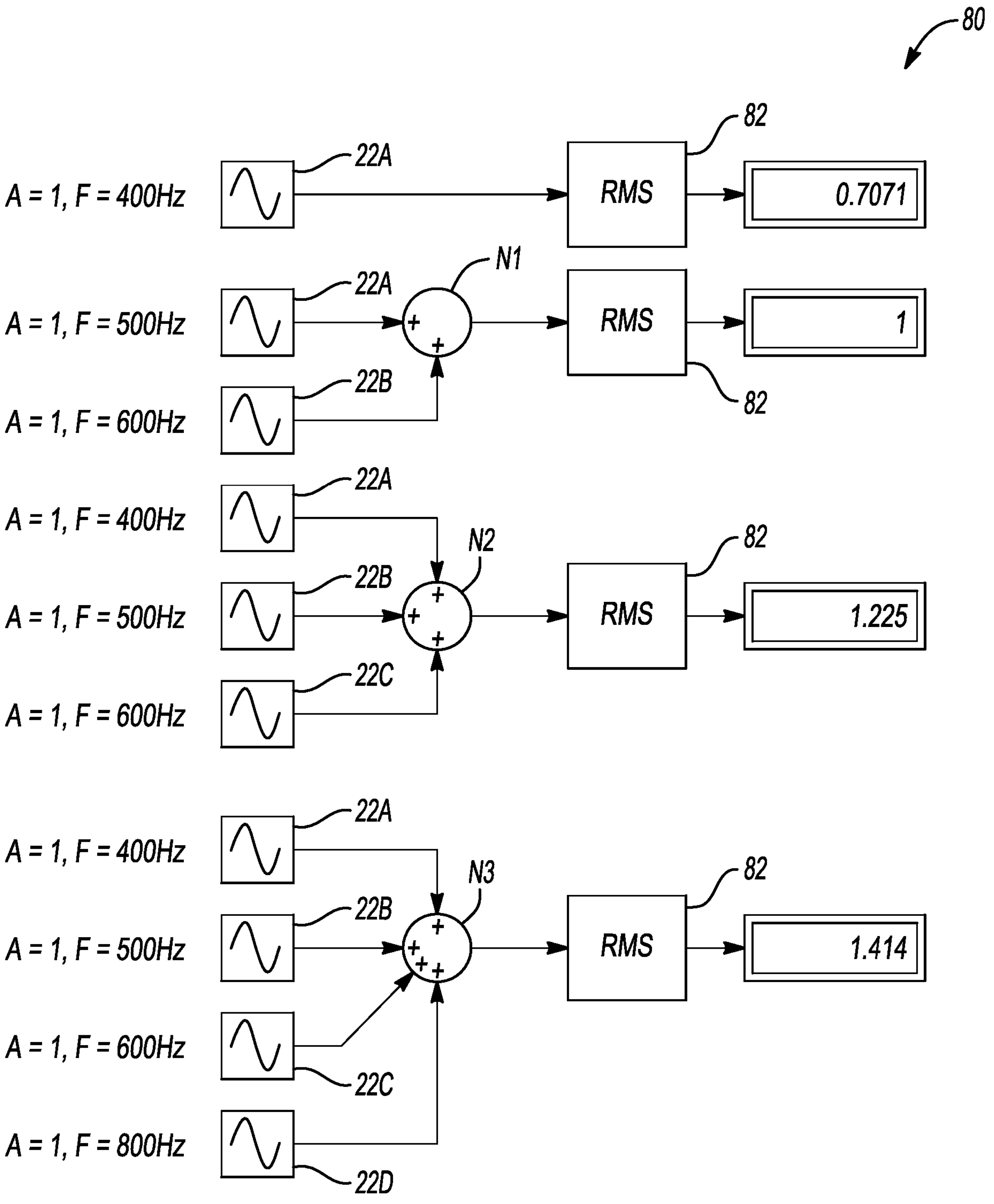
FIG. 6 illustrates asynchronous operation of AC heating across multiple electric traction motors.

Asynchronous Operation of AC Heating: referring now to FIG. 6, synchronous operation as described above is just one possible approach for AC heating of the traction battery pack 18 shown in FIG. 1. While synchronized excitation frequencies may provide optimal heating, it is also possible to use different excitation frequencies in each motor, e.g., the first and second traction motors 16A and 16B in a simplified two-motor implementation. The electronic controller 50 is therefore optionally configured to use different injection frequencies to increase AC heating in the traction battery pack 18 without synchronizing the injection frequencies of the d-axis currents.

Four examples are illustrated in FIG. 6 to illustrate the effect on RMS current in an asynchronous approach. In this case:

$$\text{RMS Asynchronized} = \frac{\sqrt{n}}{\sqrt{2}}A$$

Each of the four examples uses a normalized amplitude (A) of 1. Example (1) is a single motor (n=1), with a representative AC current waveform 22A having a nominal injection frequency of 400 Hz. Such a signal when processed by an RMS calculation block 82 will output an RMS current of 0.7071 A.

Example (2) involves two motors, i.e., n=2, and thus representative AC current waveforms 22A and 22B, e.g., as shown in the simplified two-motor implementation of FIG. 1. While the injection frequencies of F=500 Hz and F=600 Hz are merely exemplary and do not affect the resultant RMS current calculation, note that the injection frequencies are different, i.e., asynchronous. This is also true for examples (3) and (4) described below. The AC current waveforms 22A and 22B are summed via a summation node (N1) to derive an RMS current of 1 A.

Continuing with examples (3) and (4) for three-motor and four-motor embodiments in which n=3 and n=4, respectively, the RMS current increases to 1.225 A and 1.414 A. Thus, asynchronous operation will still result in AC heating of the traction battery pack 18 of FIG. 1, but to a lesser extent than synchronous operation.

Figure 7:
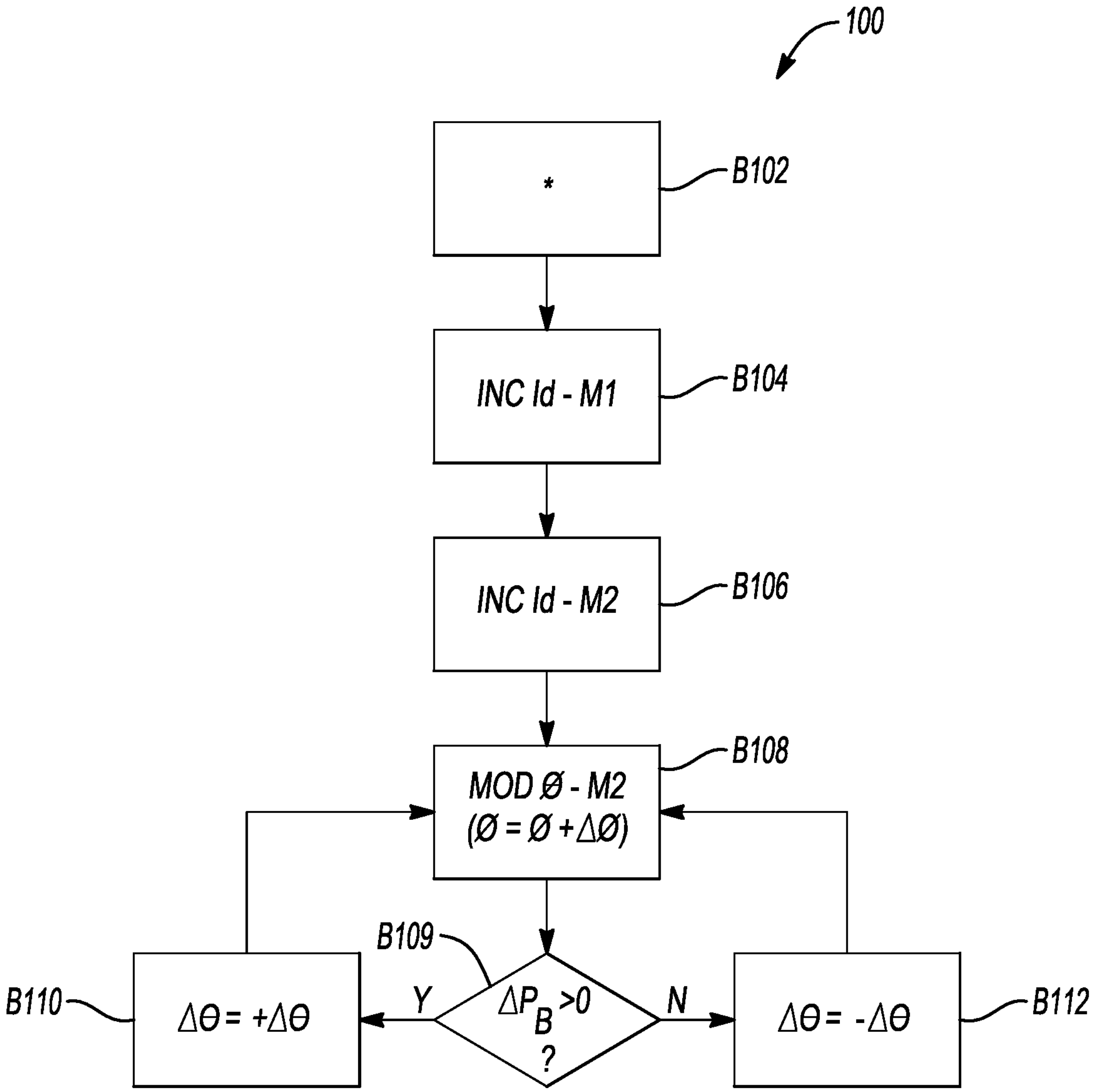
FIG. 7 is a flow chart describing a method for determining a maximum power point within the electrical system of FIG. 1.

Referring now to FIG. 7, as alluded to above it is possible to locate an optimal injection phase angle (ϕ) when performing the present AC battery heating strategy with multiple motors, e.g., the two-motor topology of FIG. 1 using the first and second traction motors 16A and 16B. A representative embodiment of a method 100 for performing such a process commences with block B102 with initialization ("*") of the electronic controller 50 of FIG. 1 when AC battery heating is desired. The electronic controller 50 may be configured to continue with the method 100 in response to predetermined entry conditions.

For instance, the method 100 may initiate onboard the motor vehicle 12 of FIG. 1 when the motor vehicle 12 is turned on and a charging session has been requested. This could occur when a user of the motor vehicle 12 plugs the motor vehicle 12 into a charging outlet (not shown) and two-way communication has been established between the electronic controller 50 and an offboard charging station. When the battery temperature ($T_{BAT}$) is less than the minimum charging temperature during this exchange, the electronic controller 50 may determine that AC heating of the traction battery pack 18 of FIG. 1 is desirable. Thus, AC heating as set forth herein may occur in conjunction with initiating a charging event of the traction battery pack 18. The method 100 proceeds to block B104.

Block B104 ("INC $i_d$-M1") includes increasing the pulsating d-axis current in the first motor generator 16A of FIG. 1. This action is depicted in FIG. 3A for a steady linear ramping action of this particular d-axis current (trace 42). The method 100 then proceeds to block B106.

Block B106 ("INC $i_d$-M2") is analogous to block B104, but performed for the second traction motor 16B. That is, block B106 includes increasing the pulsating d-axis current in the second motor generator 16B. This action is depicted in FIG. 3B for a steady linear ramping action of the d-axis current ($i_d$-M2), i.e., trace 44. The method 100 then proceeds to block B108.

At block B108 ("MOD ϕ-M2 (ϕ=ϕ+Δϕ)") includes modifying the phase angle of the second traction motor 16B. The electronic controller 50 may increase the phase angle by Δ ϕ from subsequently described block B110, or may decrease the phase angle by Δ ϕ from subsequently described block B112. The method 100 then proceeds to block B109.

At block B109 ("Δ $P_B$>0") includes determining the change in output power (Δ $P_B$) from the propulsion battery pack 18 of FIG. 1. The electronic controller 50 then determines whether the output power has increased, i.e., Δ $P_B$>0, or decreased, i.e., Δ $P_B$<0. The method 100 proceeds to block B110 when the output power of the propulsion battery pack 18 has increased, and to block B112 in the alternative when the output power of the propulsion battery pack 18 has decreased.

Block B110 ("Δ ϕ=+Δ ϕ") includes recording a delta phase angle value (Δ ϕ) for current injection of the second traction motor 16B that increases the prior value by a set amount. For example, starting with a phase angle of 20°, the electronic controller 50 may increase this value by 5°, such that the increased delta phase angle value (+Δ ϕ) is +5°. The method 100 then returns to block B108 where the increased delta phase angle value (+Δ ϕ) is applied.

Block B112 ("Δ ϕ=−Δ ϕ") is analogous to block B110, and includes recording a delta phase angle value (Δ ϕ) for current injection of the second traction motor 16B that decreases the prior value by a set amount. For example, starting with a phase angle of 20° in keeping with the example of block B110, the electronic controller 50 may decrease this value by 5°, such that the decreased delta phase angle value (−Δ ϕ) is −5°. The method 100 then returns to block B108 where the decreased delta phase angle value (−Δ ϕ) is applied as set forth above. Blocks B108-B112 thus collectively allow for maximum power point tracking to maximize AC heating of the traction battery pack 18.

The teachings set forth above with reference to FIGS. 1-7 thus enable selective AC-based heating of the traction battery pack 18 of FIG. 1 using pulsating current injection in multiple electric machines, with the electric machines exemplified herein as the first and second traction motors 16A and 16B without limitation. Among other attendant benefits, the AC heating approach enables simultaneous AC heating operation using multiple motor drive circuits of the motor vehicle 12 of FIG. 1 to effectively boost the AC battery current 22 delivered to the traction battery pack.

The AC-based battery heating process occurs without overheating the first and second traction motors 16A and 16B. Although optional, the use of supplemental cooling via the cooling loops CL-A, CL-B, and CL-BAT of FIG. 1 allow for waste heart from the first and second traction motors 16A and 16B to be used for heating the traction battery pack 18 with or without continuing AC battery heating. While asynchronous strategies are possible, various synchronization strategies may be used within the scope of the disclosure to maximize AC heating. These and other attended benefits for the present disclosure will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A multi-motor electrical system, comprising:

a battery pack;

a plurality of inverter circuits connected to the battery pack;

a plurality of electric motors connected to the battery pack via a corresponding one of the inverter circuits; and an electronic controller in communication with the inverter circuits, the electronic controller being configured, in response to predetermined entry conditions, to:

monitor respective motor temperatures of the electric motors;

selectively inject respective direct-axis (d-axis) currents into the electric motors via manipulation of a corresponding d-axis voltage command thereto;

generate an alternating current (AC) battery current via simultaneous operation of the electric motors using the d-axis currents; and heat the battery pack using the AC battery current by coordinating an injection of the d-axis currents, such that the respective motor temperatures do not exceed a predetermined motor temperature limit.

2. The multi-motor electrical system of claim 1, wherein the predetermined entry conditions include a battery temperature of the battery pack being less than a minimum charging temperature prior to or in conjunction with initiating a charging event of the battery pack.

3. The multi-motor electrical system of claim 1, wherein the electronic controller is configured to synchronize injection frequencies of the d-axis currents using a predetermined synchronization strategy.

4. The multi-motor electrical system of claim 3, wherein the predetermined synchronization strategy includes communication channel synchronization, and wherein the electronic controller is configured to determine a difference between the injection frequencies and correct for the difference.

5. The multi-motor electrical system of claim 3, wherein the predetermined synchronization strategy includes a phase-locked loop (PLL) synchronization strategy.

6. The multi-motor electrical system of claim 5, wherein the electronic controller is configured to use a perturbation or disturbance in a direct current (DC)-link voltage as an input signal for the PLL synchronization strategy.

7. The multi-motor electrical system of claim 1, wherein the electronic controller is configured to coordinate the injection of the d-axis currents by alternating operation of the electric motors responsive to a motor temperature one of the electric motors reaching the predetermined motor temperature limit.

8. The multi-motor electrical system of claim 1, further comprising:

a plurality of interconnected cooling loops configured to circulate coolant to a respective one of the plurality of electric motors and the battery pack, wherein the electronic controller is configured to direct waste heat from the plurality of electric motors to the battery pack via the interconnected cooling loops.

9. The multi-motor electrical system of claim 1, wherein the electronic controller is configured to perform maximum power point tracking to maximize AC heating of the battery pack.

10. The multi-motor electrical system of claim 1, wherein the electronic controller is configured to perform a phase angle sweep-lock strategy to adjust a phase angle difference between injected d-axis currents to thereby maximize AC heating of the battery pack.

11. The multi-motor electrical system of claim 1, wherein the electronic controller is configured to use different injection frequencies to increase AC heating in the battery pack without synchronizing the injection frequencies of the d-axis currents.

12. The multi-motor electrical system of claim 1, wherein the electronic controller is configured to use the same injection frequency and regulate a phase difference between respective AC current waveforms of the plurality of electric motors while synchronizing the injection of the d-axis currents to thereby increase AC heating in the battery pack.

13. A method for performing alternating current (AC) heating of a battery pack in a multi-motor electrical system having a plurality of inverter circuits connected to the battery pack and a plurality of electric motors connected to the battery pack via a corresponding one of the inverter circuits, the method comprising:

in response to predetermined entry conditions:

monitoring respective motor temperatures of the electric motors via an electronic controller;

selectively injecting respective direct-axis (d-axis) currents into the electric motors via manipulation by the electronic controller of a corresponding d-axis voltage command thereto;

generating an alternating current (AC) battery current via simultaneous operation of the electric motors using the d-axis currents; and heating the battery pack using the AC battery current by coordinating an injection of the d-axis currents, such that the respective motor temperatures do not exceed a predetermined motor temperature limit, wherein the predetermined entry conditions include a battery temperature of the battery pack being less than a minimum charging temperature prior to or in conjunction with initiating a charging event of the battery pack.

14. The method of claim 13, further comprising:

synchronizing injection frequencies of the d-axis currents via the electronic controller using a predetermined synchronization strategy, the predetermined synchronization strategy including communication channel synchronization or a phase-locked loop (PLL) synchronization strategy.

15. The method of claim 14, including synchronizing the injection frequencies of the d-axis currents using the PLL synchronization strategy, further comprising:

using a perturbation or disturbance in a direct current (DC)-link voltage as an input signal for the PLL synchronization strategy.

16. The method of claim 13, further comprising:

coordinating the injection of the d-axis currents via the electronic controller by alternating operation of the electric motors responsive to a motor temperature one of the electric motors reaching the predetermined motor temperature limit.

17. The method of claim 13, further comprising:

circulating coolant to a respective one of the electric motors and the battery pack via a plurality of interconnected cooling loops; and directing waste heat from the electric motors to the battery pack via the interconnected cooling loops.

18. The method of claim 13, further comprising:

performing maximum power point tracking via the electronic controller to maximize AC heating of the battery pack.

19. A motor vehicle comprising:

a vehicle body;

road wheels connected to the vehicle body; and a multi-motor electrical system including:

a traction battery pack having a battery temperature;

a plurality of inverter circuits connected to the traction battery pack;

a plurality of electric traction motors connected to the traction battery pack via a corresponding one of the inverter circuits, and to one or more of the road wheels; and an electronic controller in communication with the inverter circuits, the electronic controller being configured, in response to predetermined entry conditions including the battery temperature being less than a minimum charging temperature prior to or in conjunction with initiating a charging event of the traction battery pack, to:

monitor respective motor temperatures of the electric traction motors;

selectively inject respective direct-axis (d-axis) currents into the electric traction motors via manipulation of a corresponding d-axis voltage command thereto;

generate an alternating current (AC) battery current via simultaneous operation of the electric motors using the d-axis currents; and heat the traction battery pack using the AC battery current by coordinating an injection of the d-axis currents, such that the respective motor temperatures do not exceed a predetermined motor temperature limit, including alternating operation of the electric traction motors responsive to a motor temperature one of the electric traction motors reaching the predetermined motor temperature limit.

20. The motor vehicle of claim 19, further comprising:

a plurality of interconnected cooling loops configured to circulate coolant to a respective one of the electric motors and the battery pack, wherein the electronic controller is configured to direct waste heat from the electric motors to the battery pack via the interconnected cooling loops.

* * * * *